United States Patent
Balakrishnan et al.

(10) Patent No.: US 11,790,558 B1
(45) Date of Patent: Oct. 17, 2023

(54) GENERATION OF SYNTHETIC IMAGE DATA WITH VARIED ATTRIBUTES

(71) Applicant: Amazon Technologies, Inc., Seattle, WA (US)

(72) Inventors: Guha Balakrishnan, Princeton, NJ (US); Raghu Deep Gadde, Bellevue, WA (US); Pietro Perona, Altadena, CA (US); Aleix Margarit Martinez, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 231 days.

(21) Appl. No.: 17/363,504

(22) Filed: Jun. 30, 2021

(51) Int. Cl.
  *G06N 20/00* (2019.01)
  *G06T 7/00* (2017.01)
  *G06V 10/75* (2022.01)
  *G06F 18/214* (2023.01)

(52) U.S. Cl.
  CPC .............. *G06T 7/97* (2017.01); *G06F 18/214* (2023.01); *G06N 20/00* (2019.01); *G06V 10/76* (2022.01)

(58) Field of Classification Search
  None
  See application file for complete search history.

(56) References Cited

U.S. PATENT DOCUMENTS

| | | | | |
|---|---|---|---|---|
| 2018/0075602 A1* | 3/2018 | Shen | .......................... | G06T 7/62 |
| 2021/0173968 A1* | 6/2021 | Yang | ........................ | G06F 30/27 |
| 2021/0248669 A1* | 8/2021 | Wade | ....................... | G06F 3/011 |
| 2021/0272368 A1* | 9/2021 | Dorin | ..................... | G06T 19/006 |
| 2022/0129974 A1* | 4/2022 | Delgado | ................ | G06V 20/64 |
| 2022/0327608 A1* | 10/2022 | Assouline | ............. | G06T 19/006 |
| 2023/0095027 A1* | 3/2023 | Yen | ........................... | G06N 3/02 |
| | | | | 382/311 |

OTHER PUBLICATIONS

Kingma et al., Auto-Encoding Variational Bayes; Arxiv; Dec. 20, 2013; 9 pgs; Cornell University.
Goodfellow et al.; Generative Adversarial Nets; Advances in Neural Information Processing Nets; Jun. 10, 2014; vol. 27; 9 pgs.
Mirza et al.; Conditional Generative Adversarial Nets; Arxiv; Nov. 6, 2014; 7 pgs; Cornell University.

(Continued)

*Primary Examiner* — Soo Shin
(74) *Attorney, Agent, or Firm* — K&L Gates LLP (57) ABSTRACT

Techniques are generally described for generation of synthetic image data. In some examples, a selection of a first image may be received. The first image may depict at least a first object having a plurality of image attributes representing visual characteristics of the at least the first object. In some examples, a selection of a first image attribute of the plurality of image attributes to be maintained in subsequently-generated images may be received. In various examples, a first machine learning model may generate a second image having the plurality of image attributes. The change in an appearance of the first image attribute may be minimized in the second image while a change in the appearance of other attributes of the plurality of image attributes may be maximized in the second image.

20 Claims, 7 Drawing Sheets

(56) References Cited

OTHER PUBLICATIONS

Radford et al.; Unsupervised Representational Learning with Deep Convolutional Generative Adversarial Networks; Arxiv; Nov. 19, 2015; 15 pgs; Cornell University.

Antipov et al.; Face Aging with Conditional Generative Adversarial Networks; 2017 IEEE International Conference on Image Processing (ICIP); 2017; pp. 2089-2093.

Lample et al; Fader Networks: Manipulating Images by Sliding Attributes; 31st Conference on Neural Information Processing Systems; 2017; 10 Pgs; Long Beach, CA.

Tran et al.; Disentangled Representation Learning GAN for Pose-Invariant Face Recognition; 2017 IEEE Conference on Computer Vision and Pattern Recognition; 2017; pp. 1283-1292.

Upchurch et al.; Deep Feature Interpolation for Image Content Changes; 2017 IEEE Confernece on Computer Vision and Pattern Recognition; 2017; pp. 6090-6099.

Odena et al.; Conditional Image Synthesis with Auxiliary Classifier GANs; Proceedings of the $34^{th}$ Intl Conference on Machine Learning; 2017; 10 pgs; vol. 70; Sydney, Australia.

Yin et al.; Towards Large-Pose Face Frontalization in the Wild; 2017 IEEE International Conference on Computer Vision; 2017; pp. 4010-4019.

Bao et al.; Towards Open-Set Identity Preserving Face Synthesis; 2018 IEEE/CVF Conference on Computer Vision and Pattern Recognition; 2018 pp. 6713-6722.

Chen et al.; Metrics for Deep Generative Models; Proceedings of the 21st Intl Conference on Artificial Intelligence and Statistics (AISTATS); 2018; 10 pgs; vol. 84; Spain.

Choi et al; StarGAN: Unified Generative Adversarial Networks for Multi-Domain Image-to-Image Translation; 2018 IEEE/CVF Conference on Computer Vision and Pattern Recognition; 2018; pp. 8789-8797.

Shao et al.; The Riemannian Geometry of Deep Generative Models; 2018 IEEE/CVF Conference on Computer Vision and Pattern Recognition Workshops; 2018; 9 pgs.

Shen et al.; FaceID-GAN: Learning a Symmetry Three-Player GAN for Identity-Preserving Face Synthesis; 2018 IEEE/CVF Conference on Computer Vision and Pattern Recognition; 2018; pp. 821-830.

Wang et al.; High-Resolution Image Synthesis and Semantic Manipulation with Conditional GANs; 2018 IEEE/CVF Conference on Computer Vision and Pattern Recognition; 2018; pp. 8798-8807.

Arvanitidis et al.; Latent Space Oddity: On the Curvature of Deep Generative Models; Arxiv; Jan. 31, 2018; 15 pgs; Cornell University.

Xiao et al.; ELEGANT: Exchanging Latent Encodings with GAN for Transferring Multiple Face Attributes: Arxiv; Mar. 28, 2018; 17 pgs.

Kocaoglu et al; CausalGAN: Learning Causal Implicit Generative Models with Adversarial Training; 6th International Conference on Learning Representations; Apr. 30, 2018; 33 pgs; Canada.

Kuhnel et al.; Latent Space Non-Linear Statistics; Arxiv; May 19, 2018; 9 pgs; Cornell University.

Shen et al.; FaceFeat-GAN: a Two-Stage Approach for Identity-Preserving Face Synthesis; Arxiv; Dec. 4, 2018; Cornell University.

Deng et al.; ArcFace: Additive Angular Margin Loss for Deep Face Recognition; 2019 IEEE/CVF Conference on Computer Vision and Pattern Recognition; 2019; pp. 4685-4694.

Goetschalckx et al.; GANalyze: Toward Visual Definitions of Cognitive Image Properties; 2019 IEEE/CVF Intl Conference on Computer Vision; 2019; pp. 5743-5752.

Karras et al.; A Style-Based Generator Architecture for Generative Adversarial Networks; 2019 IEEE/CVF Conference on Computer Vision and Pattern Recognition; 2019; pp. 4396-4405.

Liu et al.; STGAN: A Unified Selective Transfer Network for Arbitrary Image Attribute Editing; 2019 IEEE/CVF Conference on Computer Vision and Pattern Recognition; 2019; pp. 3668-3677.

Park et al.; Semantic Image Synthesis with Spatially-Adaptive Normalization; 2019 IEEE/CVF Conference on Computer Vision and Pattern Recognition; 2019; pp. 2332-2341.

Ghojogh et al.; Eigenvalue and Generalized Eigenvalue Problems: Tutorial; Arxiv; Mar. 25, 2019; 8 pgs; Cornell University.

Shen et al.; Interpreting the Latent Space of GANs for Semantic Face Editing; Arxiv; Jul. 25, 2019; 19 pgs; Cornell University.

He et al.; AttGAN: Facial Attribute Editing by Only Changing What You Want; IEEE Transaction on Image Processing; Nov. 2019; 15 pgs; vol. 28; No. 11.

Yang et al.; Semantic Hierarchy Emerges in Deep Generative Representations for Scene Synthesis; Arxiv; Nov. 21, 2019; 19 pgs; Cornell University.

Harkonen et al.; GANSpace: Discovering Interpretable GAN Controls; 34th Conference on Neural Information Processing Systems; 2020; 10 pgs; Vancouver, Canada.

Jahanian et al.; On the Steerability of Generative Adversarial Networks; Published as a conference paper at ICLR 2020; 2020; 31 pgs.

Plumerault et al.; Controlling Generative Models with Continuous Factors of Variations; Published as a conference paper at ICLR 2020; 2020; 17 pgs.

Karras et al.; Analyzing and Improving the Image Quality of StyleGAN; Arxiv; Mar. 23, 2020; 21 pgs; Cornell University.

Balakrishnan et al.; Towards causal benchmarking of bias in face analysis algorithms; Arxiv; Jul. 13, 2020; 34 pgs; Cornell University.

Or-El et al.; Lifespan Age Transformation Synthesis; Arxiv; Jul. 24, 2020; 27 pgs; Cornell University.

Shoshan et al; GAN-Control: Explicitly Controllable GANs; Arxiv; Jan. 7, 2021; 10 pgs; Cornell University.

Wang et al,; The Geometry of Deep Generative Image Models and its Applications; Arxiv; Jan. 15, 2021; 23 pgs; Cornell University.

\* cited by examiner

GENERATION OF SYNTHETIC IMAGE DATA WITH VARIED ATTRIBUTES

BACKGROUND

Generation of high quality photographs, such as in the context of fashion photography and/or product photography often requires shooting in a professional photography studio with proper lighting and photography equipment. Such high quality photographs can help individuals make purchase decisions. Customers make purchase decisions not only on how the product looks, but often on how the product appears in the relevant context. For example, how a garment fits people of different sizes or body types, how a piece of furniture appears in the context of a furnished room, or how a product looks in a specific context.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In many contexts, generation of high quality photographs is a time consuming and laborious process. For example, generating photographs of living rooms for an online furniture retailer may involve shipping various furniture pieces to a photography studio, arrangement in various configurations by a designer, adding different lighting effects and/or post-processing effects, etc. E-commerce services often display millions of images of products through websites and/or mobile applications to help customers find and select the items they want. In such a context, the pictures of the items themselves as well of pictures of the item in its intended environment (e.g., a sofa depicted within a furnished living room) are an important tool for item selection.

For example, when selecting a couch for purchase, a customer may want to see not only what the couch looks like by itself, but how the couch fits in a number of different room styles (e.g., contemporary, mid-century modern, glam, rustic, etc.). Users often want to see an image of the couch as well as the images of the couch in combination with multiple other living room items, such as rugs, arm chairs, coffee tables, etc. Currently, these pictures are taken in professional photo studios. As previously described, to take these images, items are typically shipped to the photo studio where an expert interior designer arranges them in a room and a professional photographer takes the pictures. This is a very slow and expensive process. For example, the shipping costs and time needed to ship a couch and large dining table alone are considerable. This cost is multiplied many times when there are many different types of items to be photographed. Because of this, the number of products photographs may be limited and/or the photographs may be limited to a single room and/or style with a small number of other products. As described in further detail below, the synthetic image generation systems and techniques described herein may be used to automatically generate photorealistic synthetic images of various rooms arranged with furniture without requiring any physical presence of furniture or even rooms.

There are other contexts in which the various systems and techniques described herein are useful and provide benefit. For example, object detection models and/or facial recognition models are often trained on large datasets of images of the relevant objects and/or of faces. However, in some cases, the available datasets may not represent all possible object classes and/or faces (depending on the dataset) in the appropriate proportions. As a result, the model output may be biased. However, the techniques described herein may be used to generate varied synthetic images of the different classes of objects and/or faces so that the different classes are represented in the appropriate proportions and the models may be trained for accurate prediction and minimal bias due to the training data.

Described herein are systems that can generate millions of synthetic images (and/or videos) from seed images in which at least one multi-dimensional attribute (e.g., a multi-dimensional attribute embedding) of the seed image is maintained while at least one other multi-dimensional attribute of the seed image is varied in the generated images. For example, in the home furnishings context described above, rooms with one or multiple products, such as couches, chairs, tables, rugs, and lamps may be generated in a multitude of different styles, arrangements, and/or configurations of items. Additionally, an item of interest (e.g., a particular chair) may be maintained from synthetic image to synthetic image while other furniture and/or room features may be changed from image to image. Similarly, in the context of human face generation, an identity of a face (and/or one or more other visual attributes) appearing in a seed image may be maintained while modifying other attributes of the face in synthetically generated images (e.g., age, lighting, background, expression, hairstyle, etc.).

A great advantage of the synthetic image generation systems and techniques described herein is the increase in image variability. Shipping products to a professional photo studio is not only slow and costly, it also limits the number of arrangements one can make. This can lead to user frustration because users may not be able to see how a product of interest appears in a room setting that more closely resembles their home or preferred room style. The various synthetic image generation techniques described herein solves these problems by generating a large number of combinations of products in an equally large number of rooms. For example, variability may be introduced by changing the room's color, the object's color, the object's material, the object's style, etc. The various techniques described herein achieve such variability without the need to ship in new products to a physical studio or find a different room in which to display the items.

In various examples, generative adversarial networks (GANs) and related techniques like Normalizing Flows and Variational Auto-Encoders (VAEs) may be trained to generate synthetic image data and/or video data. Generally, in GANs, a generator (e.g., a generator network) is trained to generate synthetic image data based on input image data. The generator is trained to map data from a latent space to a particular data distribution of interest (e.g., a distribution of image data learned from the training dataset). Generally, in a GAN, a discriminator is used to discriminate between images from the true distribution (e.g., from real image data captured using a camera) and synthetic image data produced by the generator. The training goal of the generator is to increase the error rate of the discriminator (e.g., to generate synthetic image data that appears to be of the true distribution). Back propagation is used in both the generator and the discriminator networks so that the quality of synthetic image data produced by the generator is increased while the discriminator network becomes better at distinguishing between true data and synthetic data produced by the generator. In various examples, generators may be implemented using a deconvolutional neural network and discriminators may be implemented as a CNN.

As described herein, synthetic data may refer to data generated by a generator of a machine learning architecture (e.g., a generator of a GAN, a decoder of a VAE, etc.) according to a learned distribution. For example, a generator may be trained to generate images of living rooms, bathrooms, human faces, dogs, weddings, etc. Conversely, "real" image data may be image data captured by a camera from the natural world (e.g., a photograph of a living room, human, etc.).

Machine learning techniques, such as those described herein, are often used to form predictions, solve problems, recognize objects in image data for classification, etc. For example, herein machine learning techniques may be used to generate synthetic, photorealistic image data and/or video data. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Described herein are systems and techniques for synthesizing sets of diverse images that share a common multi-dimensional feature. In various examples, generation of such sets of images is based on traversing a GAN's latent space along paths that hold multi-dimensional attributes of an image constant while maximally changing other multi-dimensional attributes. For example, different points in the latent space along the traversal path are associated with different degrees of the change in appearance of the images as the multi-dimensional attribute values are modified. The various techniques described herein may select paths in the latent space by maximizing the ratio of differential changes in the attributes' embedding vectors. This ratio may be composed as a Rayleigh quotient which is optimized in closed-form by solving a generalized eigenvalue equation. Repeated computations of the corresponding principal eigenvectors (referred to herein as Rayleigh EigenDirections (REDs)) may be used to generate appropriately curved paths in latent space. Two example subjects of the synthetic images are generally described herein—human faces and living rooms—although the systems and techniques discussed herein may be used to generate any synthetic images. In various examples the systems and techniques described herein are capable of changing various face details while preserving a chosen multi-dimensional feature (e.g., identity or image frequencies in a given band), and changing living room layouts while holding the appearance and position of a subset of objects constant. The local analysis of the geometry and semantics of latent spaces may therefore be used to control the generation of synthetic images according to the desired outcome.

Though capable of producing realistic images, unsupervised GANs do not offer explicit control over image attributes, a desirable property for applications such as art, image editing, entertainment, graphic design, and data augmentation. However, GANs do spontaneously learn to disentangle attributes in their latent spaces. Most attempts to control GAN outputs focus on supervised learning of latent space directions, often using a linear model per attribute. A user can systematically generate images that preserve specific attributes and modify others by traversing the latent space in the latter attribute directions.

While successful, these approaches are limited to scalar attributes that are meaningful and easily describable to human annotators, such as age, gender, and skin color and basic image transformations like translation, color change and camera movements.

But these approaches cannot be easily extended to work with attributes like 'style of couch' or 'face identity.' Scalar spaces are not appropriate for computing image similarity along these attributes. For example, identity is typically represented in a multi-dimensional space. For example, in order to find a latent space traversal that preserves identity, the similarity of two high-dimensional vectors (e.g., 512 dimensional vectors) representing the identities of a pair of faces may be computed. To do so, a multi-dimensional representation is needed. In addition, faces with the same identity or rooms with the same furniture layout tend to be tightly clustered in latent space, requiring methods tuned to local latent space geometry unlike previous global supervised models used for traditional attributes. The approaches described herein solve these problems.

The broader class of GAN traversal problems may be described as follows. Given a point in a GAN's latent space, the goal is to generate many traversals, or sequences of images, that hold at least one multi-dimensional feature (e.g., a multi-dimensional vector) constant while varying at least one other multi-dimensional feature in as many ways as possible. Attribute-specific embedding vectors (e.g., multi-dimensional attribute-specific embedding vectors) for each attribute of interest may be determined using a machine learning model specific to that attribute of interest (e.g., a classifier or any other machine learning model).

In various examples the methods described herein for achieving this goal include two components. First, the task of finding local optimal directions is formulated as a maximization problem involving the Rayleigh quotient of the two embedding Jacobian matrices. The closed-form solution is obtained by solving a generalized eigenvalue equation. The principal eigenvectors of this equation, referred to herein as Rayleigh EigenDirections (REDs), span the local latent subspace containing good paths. Second, a fast linear traversal algorithm and a more accurate iterative nonlinear projection traversal algorithm using REDs are described. The various approaches described herein are agnostic to GAN, VAE, or other machine learning generator architecture, scene content, and choice of attribute embedding function and applies to black-box pre-trained generators.

Figure 1:
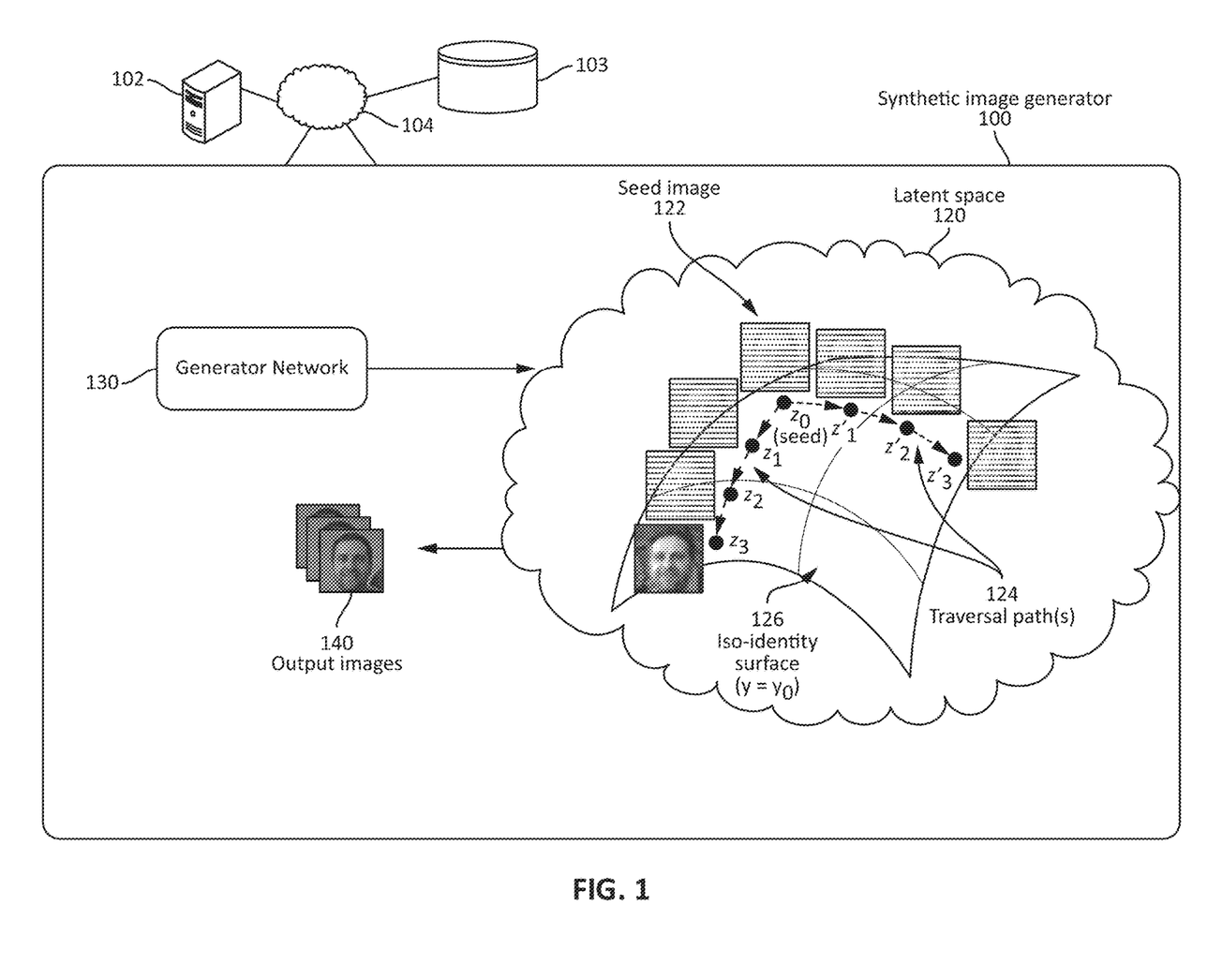
FIG. 1 is a block diagram showing an example system effective to generate synthetic image data with varied attributes, arranged in accordance with various aspects of the present disclosure.

FIG. 1 is a block diagram showing an example system effective to generate synthetic image data with varied attributes, arranged in accordance with various aspects of the present disclosure. In various examples, synthetic image generator 100 may be implemented by one or more computing devices 102 that may be configured in communication over a network 104. Network 104 may be a communication network such as a local area network (LAN), a wide area network (such as the Internet), or some combination thereof. The one or more computing devices 102 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

Synthetic image generator 100 may comprise a generator network 130 (e.g., a generator network trained as part of a GAN, a VAE, and/or any other machine learning generative network associated with the mapping of a latent space to a target distribution). The generator network 130 may be trained using image data of any desired distribution. In the example depicted in FIG. 1, the generator network 130 has been trained to generate synthetic image data representing human faces. However, in other example embodiments, the generator network 130 may generate any type of image data of any desired distribution (e.g., images of living rooms).

For example, the generator network 130 may generate images of objects disposed alone or together with other objects in an environment of interest. As used herein, such objects may include people, animals, and/or things. In some other examples, the generator network 130 may be used to generate abstract images that conform to the distribution learned from the training images. In general, the generator network 130 may be effective to generate images of any desired subject matter depending only on the training images supplied to the generator network 130. For ease of illustration, living rooms may be used herein as an example of a type of synthetic image data that may be generated by the generator network 130 of synthetic image generator 100.

In various examples, a local latent space of latent space 120 may be traversed around a 'seed point' $z_0$ (e.g., a point in the latent space 120 corresponding to seed image 122) along optimally chosen paths to synthesize images that share the same high-dimensional attribute value $y_0$ (e.g., identity), and vary as much as possible across other image attributes (e.g., background, lighting, expression, age, hairstyle). Accordingly, in the example of FIG. 1, latent space 120 is traversed from $z_0$ to $z_1$, from $z_1$ to $z_2$, etc. and also from $z_0$ to $z'_1$, from $z'_1$ to $z'_2$, etc., along traversal path(s) 124. Traversal paths 124 are determined using techniques described in further detail below and attempt to conform to a manifold of latent space 120 that maintains at least one multi-dimensional attribute (e.g., identity in FIG. 1) while maximally varying other image attributes. In the example of FIG. 1 where identity is maintained, the manifold of the latent space 120 along which identity is constant is depicted as iso-identity surface 126 ($y=y_0$). The various points in multi-dimensional space along traversal paths 124 (e.g., $z_1$, $z'_1$, $z_2$, $z'_2$, etc.) may be decoded to generate output images 140.

The goal may be to synthesize a set of images that have a similar value for a vector-valued feature y (e.g., face identity). The images in the set are otherwise as diverse as possible with respect to a vector-valued feature x different from y (e.g., lighting, hair style, etc.). The strategy is to start from a seed image $z_0 \in \mathcal{R}^d$ and generate all other images by sampling in latent space along paths, or traversals, that radiate out from the seed.

The function that computes the fixed features is denoted as f: $z \rightarrow y \in \mathcal{R}^n$, and the function that computes the changing features is denoted as c: $z \rightarrow x \in \mathcal{R}^m$. For example, in an example using face identity, f(·) is the concatenation of two functions: the GAN generator on the input latent vector, and a face identity embedding model on the synthesized face. c(·) may be the generator itself (i.e., x=c(·) are the pixels of the image) or the concatenation of the generator with models computing various face attributes from the face image.

Given a point $z_0 \in \mathcal{R}^d$ in the generator's latent space with corresponding features $y_0 = f(z_0)$ and $x_0 = c(z_0)$, the approach may generate many latent code sequences traversing different paths in latent space. For each such sequence $z_1, \ldots, z_L$, $y_i$ should be $y_0$ for all i and $\|x_i - x_{i+1}\| < \|x_i - x_{i+2}\|$, where $\|\cdot\|$ is a norm.

A key condition behind the various systems and techniques described herein is that around each seed point $z_0$ there exists a manifold on which y does not change. This is verified whenever the generator function is continuous (which, by inspection, it is, apart from a zero-size set) and when d>n and thus the iso-y manifold has dimension n−d. When d≤n the approach naturally transitions to a "soft" constraint $y_i \approx y_0$ as described below. Directions or "paths" through the latent space are determined. These directions are referred to as "Rayleigh EigenDirections" (REDs), that maximally change x within the subspace while changing y minimally. Two traversal strategies that use REDs are described herein. For example, a linear method is described that extrapolates the local REDs throughout the latent space. Additionally, a nonlinear method is described (e.g., a projection method) that updates traversal directions based on local latent space geometry.

Rayleigh EigenDirections (REDs)

Let z be a generic point in the generator's latent space. The identity and attributes of the corresponding image are $y=f(z)$ and $x=c(z)$. Given a displacement $\delta z$ to the latent point, the displacements to y and x are:

$$\delta y = f(z+\delta z) - f(z) \qquad (1)$$

$$\delta x = c(z+\delta z) - c(z) \qquad (2)$$

The goal is to determine the direction that maximizes $\delta x$ with minimal change to $\delta y$. This may be accomplished by finding the direction $\delta z^*$ that maximizes the ratio $r_z(\cdot)$ of the displacements as follows:

$$\delta z^* = \operatorname*{argmax}_{\delta z} r_z(\delta z) \qquad (3)$$

$$r_z(\delta z) \doteq \frac{\|\delta x\|^2}{\|\delta y\|^2} = \frac{\delta x^T \delta x}{\delta y^T \delta y} \qquad (4)$$

where $\delta x$ and $\delta y$ are implicitly dependent on z and $\delta z$. This ratio may be explicitly rewritten in terms of $\delta z$ by approximating $\delta y$ and $\delta x$ with local linear expansions for sufficiently small $\|\delta z\|$: $\delta y \approx J_f(z)\delta z$ and $\delta x \approx J_c(z)\delta z$, where $J_f \in \mathcal{R}^{m \times d}$ and $J_c \in \mathcal{R}^{m \times d}$ are Jacobian matrices:

$$r_z(\delta z) = \frac{\delta x^T \delta y}{\delta x^T \delta y} = \frac{\delta z^T J_c^T(z) J_c(z) \delta z}{\delta z^T J_f^T(z) J_f(z) \delta z} = \frac{\delta z^T A_c(z) \delta z}{\delta z^T A_f(z) \delta z} \qquad (5)$$

where $A_f(z) = J_f^T(z) J_f(z)$ and $A_c(z) = (z) J_c(z)$. This ratio is known as the Rayleigh quotient of $A_c(z)$ relative to $A_f(z)$. The maximum value and corresponding input, $(r_z(\delta z^*), \delta z^*)$, is also the maximum eigenvalue and corresponding eigenvector $(\lambda^*, v^*)$ that solves the generalized eigenvalue problem:

$$A_c v = \lambda A_f v. \qquad (6)$$

For this reason, $\delta z^*$ may be referred to as the principal RED for z. Furthermore, when $d > n$, $A_f$ is low-rank, implying that $f(\cdot)$ is constant on a manifold around z. In such cases, any $\delta z$ in $A_f$'s nullspace will result in $\lambda = r_z(\delta z) = \infty$. Taking this into consideration, $A_c$ is first projected onto the nullspace of $A_f$, and eigenvectors of the resulting matrix are computed. The threshold $\epsilon$ allows the user control in approximating $A_f$'s nullspace—larger $\epsilon$ values will increase the size of the nullspace, thereby giving more slack in changing $f(\cdot)$. This threshold also gracefully handles the case where $A_f$ does not have an exact nullspace, and an approximation is needed. The top K computed REDs may be denoted by $R \in \mathcal{R}^{d \times K}$.

The computational cost of finding REDs lies mainly in calculating the matrices $A_f$ and $A_c$. These matrices may be computed using one-sided finite difference approximations, which requires $d+1$ forward evaluations through the generator, $f(\cdot)$ and $c(\cdot)$.

Traversal Algorithms

As previously described, two latent space traversal algorithms using REDs are discussed herein. The first is a plain linear traversal as in Algorithm 2 (below). A direction in the span of $R_0$ may be randomly selected (the first K REDs of $z_0$) and new latent codes $z_1, \ldots, z_K$ may be generated by moving in that direction starting from $z_0$. Eventually, the eigenvector becomes tangential to the surface of the manifold of the attribute that is to be maintained. This approach is computationally cheap and need not use supervised linear models (in contrast with previous approaches), with the exception that the direction is computed locally around $z_0$. In the likely case that the constant-y manifold is curved, the linear traversal is expected to diverge quadratically from $\|\delta y\| = 0$ as a function of $\|\delta z\|$.

---

Algorithm 1: Compute local REDs (getREDs)

---

Input: z, K (# of REDs), $\epsilon$ (threshold)
Output: $R \in \mathcal{R}^{d \times K}$
$A_f, A_c \leftarrow$ finite difference approximation around z
$U_f, S_f, V_f^T \leftarrow \text{SVD}(A_f)$
$\tilde{S}_f \leftarrow I_{d \times d}$
$\tilde{S}_f(i, i) \leftarrow 0$ if $S_f(i, i) > \epsilon$, for all i
$R \leftarrow$ first K eigenvectors of $V_f \tilde{S}_f U_f^T A_c$

---

Algorithm 2: Linear traversal

---

Input: $z_0$, K, $\epsilon$, L (path length), s (path step)
Output: $z_1, \ldots, z_L$
$R_0 \leftarrow \text{getREDs}(z_0, K, \epsilon)$
$v \sim \text{Unif}_{K \times 1}(-1, 1)$
$\delta z_0 \leftarrow R_0 v$
for i = 1 ... L do
 |
 |__$z_i \leftarrow z_{i-1} + s \cdot \delta z_0 / \|\delta z_0\|$

---

Algorithm 3: Projection traversal

---

Input: $z_0$, K, $\epsilon$, L (path length), s (path step)
Output: $z_1, \ldots, z_L$
$R_0 \leftarrow \text{getREDs}(z_0, K, \epsilon)$
$v \sim \text{Unif}_{K \times 1}(-1, 1)$
$\delta z_0 \leftarrow R_0 v$
for i = 1 ... L do
 | $z_i \leftarrow z_{i-1} + s \cdot \delta z_0 / \|\delta z_0\|$
 | $R_i \leftarrow \text{get\_REDs}(z_i, \epsilon, K)$
 |__$\delta z_i \leftarrow R_i R_i^T \delta z_{i-1}$

---

The second traversal algorithm, Projection, given in Algorithm 3, addresses this shortcoming by re-computing the space of local REDs along the traversal path. Algorithm 3 is again started by selecting a random direction in $R_0$. However, at each step i, the previous direction, $\delta z_{i-1}$, is projected onto $R_i$ resulting in a traversal that more faithfully adheres to the local geometries of $f(\cdot)$ and $c(\cdot)$ in latent space.

Alternative Method to Compute the Rayleigh Criterion

The goal may be to find a solution to the following criterion:

$$r = \frac{V^T A V}{V^T B V} \qquad (1)$$

in a d-dimensional Hilbert space $\mathcal{H}$, with the columns of V, $v_i$, a basis vector in $\mathcal{H}$ with the $i^{th}$ maximum projected value r. Here, both A and B are symmetric, positive semi-definite matrices.

In general, B is singular. Let rank(B)=m<d, then the eigenvalue decomposition of B is BU=UΛ, with U=($u_1$, ..., $u_d$), Λ=($\lambda_1$, ..., $\lambda_d$), $\lambda_1 \geq ... \geq \lambda_m > \lambda_{m+1} = ... = \lambda_d = 0$. To maximize r, the eigenvectors of A associated to the largest eigenvalues in the null space of B are computed. A may be projected onto the null(B) as $\tilde{A} = \tilde{U}^T A \tilde{U}$, where $\tilde{U} = (u_{m+1}, ..., u_d)$.

Let $$\tilde{A}W = W\tilde{\Lambda} \quad (2)$$

where W=($w_1$, ..., $w_{d-m}$), and $\tilde{\Lambda} = (\tilde{\lambda}_1, ..., \tilde{\lambda}_{d-m})$ $\tilde{\lambda}_1 > ... > \tilde{\lambda}_{d-m} > 0$. Then, the $i^{th}$ maximum value of r is given by the space defined by $w_i$.

Finding Alignment Between Eigenvectors

The Rayleigh criterion may sometimes be biased by the metric to be maximized and sometimes by the metric to be minimized, especially when these two metric disagree on a common solution. For the various techniques described herein, the solutions of interest to the Rayleigh criterion are those that maximize (the numerator) and minimize (the denominator) simultaneously. Given the two symmetric positive semi-definite matrices A and B, the following steps may be used to obtain $v_i$.

1. Compute $B^{-1}$. Any approximate technique from the literature can be used. Some approaches are listed below.

2. Compute Eigen vectors $a_i$ of A and $b_i$ of $B^{-1}$

3. Compute a pairwise matrix C where each element is the difference in orientation of vectors $a_i$ and $b_j$ using a metric such as cosine distance i.e, $c_{ji} = a_i, b_j$.

4. Find appropriate $a_i$ and $a_j$ such that $c_{ij}$=MIN(C), $a_i \notin$ nullspace(A), $b_j \notin$ nullspace($B^{-1}$).

5. Compute $v_i = \alpha a_i + (1-\alpha) b_j$. (e.g., $\alpha=0.5$).

Computing $B^{-1}$

As B is low rank, computing its inverse can be non trivial. The following are three example methods of computing B inverse.

1. Make B full rank by adding a small constant E to diagonal elements ($b_{ii}$) of B (i.e, $b_{ii} \approx b_{ii} + \epsilon$). Here $\epsilon$ is a sufficiently large constant that makes B full rank so that the inverse exists.

2. Compute the generalized or pseudo inverse.

3. Use the approach described in Algorithm-1, above.

A Non-Linear Approach

Yet another extension is to use the Laplacian eigenmaps algorithm. In such case, the non-linear direction is determined that maximizes the following algorithm. First, a graph of points is computed on the manifold in the latent space. For every two points ($x_i$ and $x_j$) on the manifold, a weight $w_{ji}=\exp{-||x_i-x_j||^2/t}$ is assigned, where $||\cdot||$ is a metric and t>0 a parameter. Second, the eigenvectors of $$LV = \Lambda DV, \quad (3)$$

may be computed, where L=D−W, and $D_{ij}=0$ for all i≠j and $\Sigma_j w_{ji}$ when i=j.

The above metric may be determined by $B^{-1}A$, A, $B^{-1}$, a simple Euclidean distance, or any other alternative.

Figure 2A:
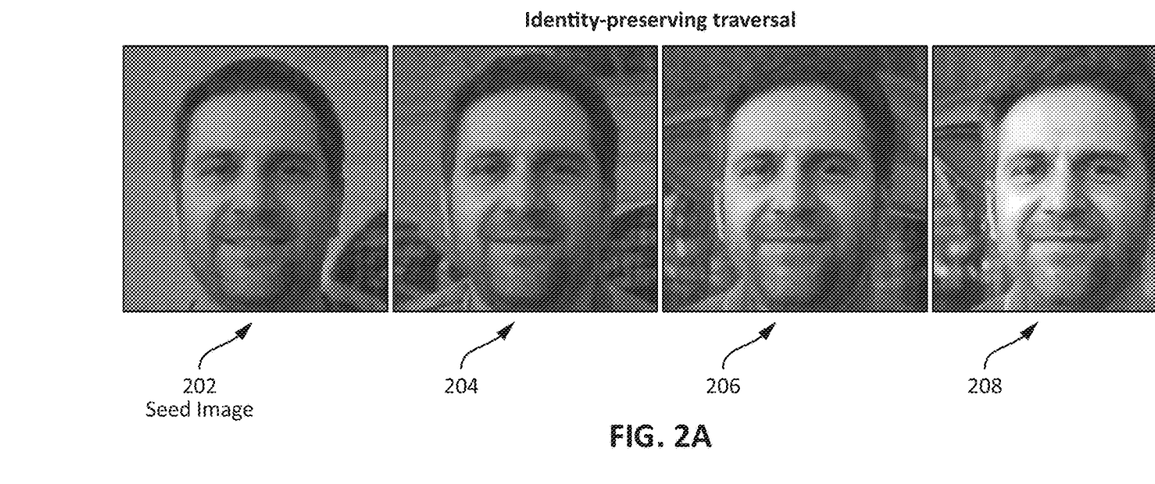
FIG. 2A is a diagram depicting a seed image and three images generated by traversing a latent space of a generator model along a path that preserves an identity of the seed image while varying other attributes, in accordance with various aspects of the present disclosure.

FIG. 2A is a diagram depicting a seed image 202 and three images 204, 206, and 208 generated by traversing a latent space of a generator model along a path that preserves an identity of the seed image 202 while varying other attributes, in accordance with various aspects of the present disclosure. For example, in FIG. 2A, the background of the images, the lighting, and the hairstyles are all varied while preserving the facial identity of the synthetically-generated face.

Figure 2B:
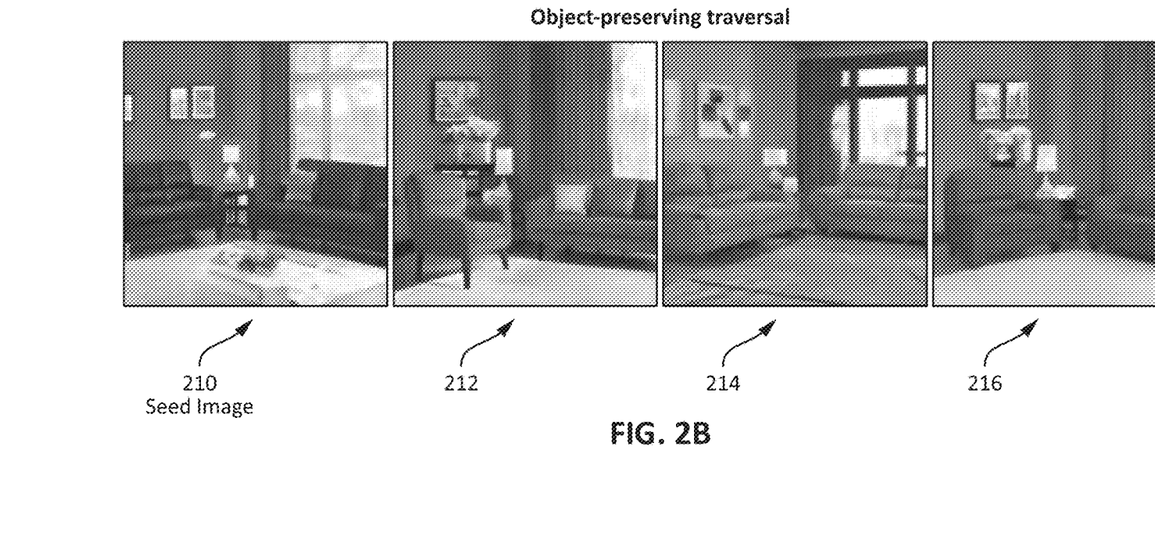
FIG. 2B is a diagram depicting a seed image and three images generated by traversing a latent space of a generator model along a path that preserves an object of the seed image while varying other image attributes, in accordance with various aspects of the present disclosure.

FIG. 2B is a diagram depicting a seed image 210 and three images 212, 214, and 216 generated by traversing a latent space of a generator model along a path that preserves an object of the seed image while varying other image attributes, in accordance with various aspects of the present disclosure. In the example of FIG. 2B, the lamp depicted in the seed image may be selected as an object to be maintained in subsequently-generated images. Accordingly, the lamp is maintained in images 212, 214, and 216 while the other furniture and visual aspects of the room are varied from image to image.

Figure 3:
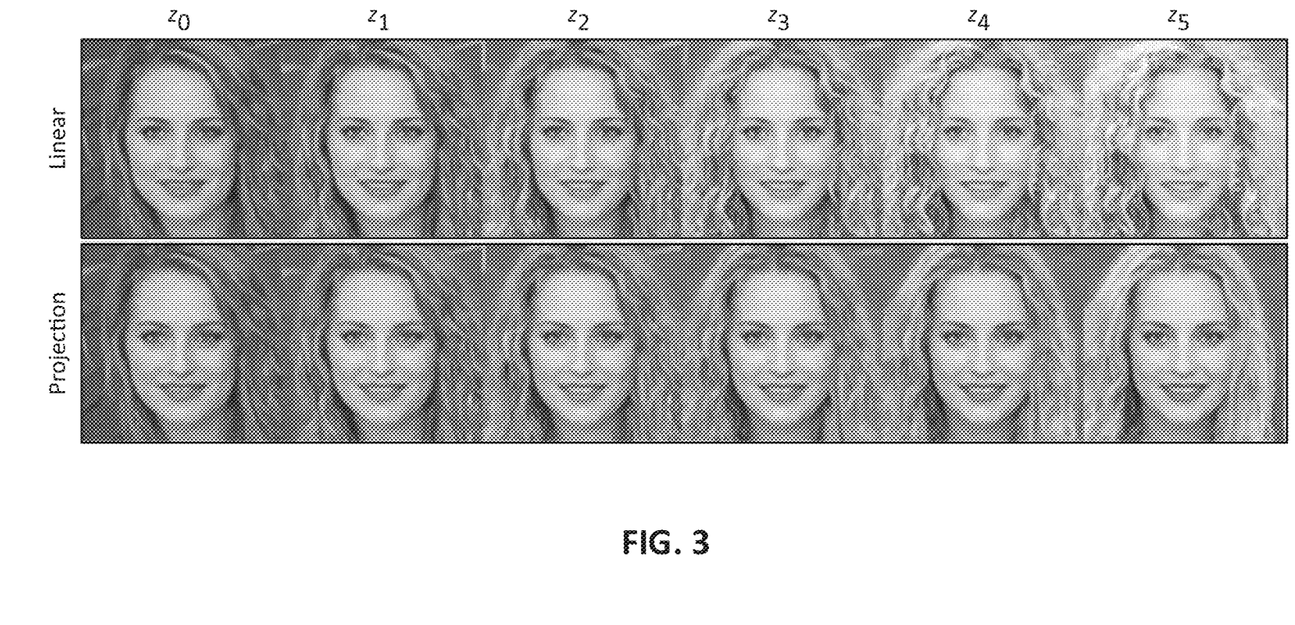
FIG. 3 depicts a series of synthetic human face images varying characteristics generated by traversing the latent space using two different techniques, in accordance with various aspects of the present disclosure.

FIG. 3 depicts a series of synthetic human face images varying characteristics generated by traversing the latent space using two different techniques, in accordance with various aspects of the present disclosure. In FIG. 3, the top row of images are projected from seed image $z_0$ using the linear method (e.g., Algorithm 2, above), while the bottom row of images are projected from the seed image $z_0$ using the projection method (e.g., Algorithm 3, above). Plots of the squared pixel distance between subsequently-generated images, squared identity representation distance, and the ratio of squared identity distance to the squared identity representation distance (not shown) indicate that while the Linear and Projection methods change pixels by roughly the same amount from image-to-image, the projection method is better at preserving identity over time.

Object Preserving Living Room Traversals

The various techniques described herein may be applied to controlled living room (or other arranged rooms) generation. The appearance of selected furniture may be maintained (e.g., fixed), while changing other parts of the scene. In various examples, furniture bounding boxes may be generated using an object detector. f(·) may be used to encode the raw pixels within the bounding box, and c(·) may be used to encode all remaining pixels in the scene. Example outputs are depicted in FIG. 2B.

Frequency Preserving Face Traversals

The various techniques described herein may be used to handle arbitrary low-level image representations. For example, let f(·) and c(·) may encode the raw pixels of low-pass and high-pass filtered versions of the input image (and vice versa). High-pass modifications change physiognomies, expressions and accessory textures. Low-pass modifications mainly change colors, lighting and shading. In some other examples, f(·) and c(·) may be functions that encode attributes of any input data, according to the particular use case. For example, the functions may generate representations of text (e.g., a caption for an image) and/or of any attributes of input image data. In an example where the functions generate representations of text describing an image, the attributes may be modified to alter the words used in the text while maintaining other attributes (e.g., overall semantic meaning of the caption).

Figure 4:
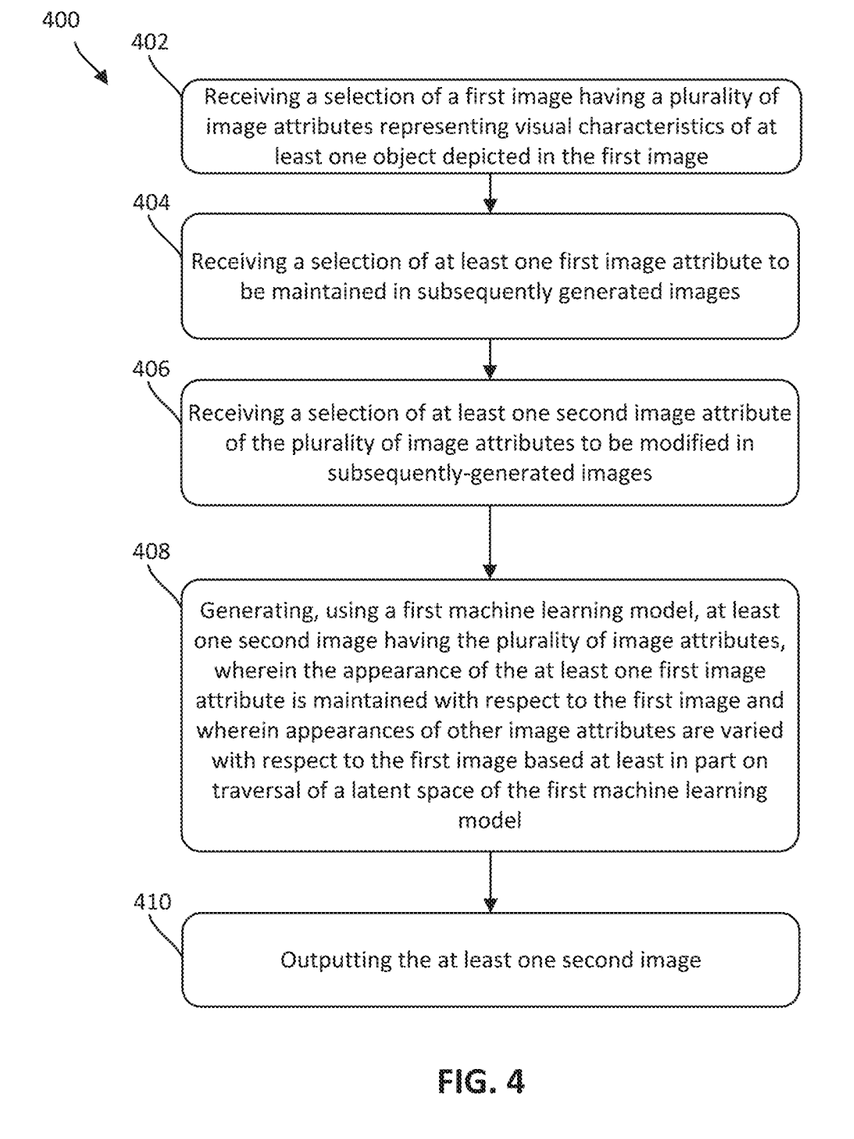
FIG. 4 depicts an example process for generating synthetic images that vary at least one image attribute while minimizing change in at least one other image attribute, in accordance with various aspects of the present disclosure.

FIG. 4 depicts an example process 400 for generating synthetic images that vary at least one image attribute while minimizing change in at least one other image attribute, in accordance with various aspects of the present disclosure. In various examples, synthetic image data may be displayed to illustrate a particular type of scene to a user. For example, the training data used to train a generator network may comprise photographs of living rooms including items for sale via an e-commerce service. The generator may thereafter generate synthetic images of living rooms conforming to the distribution of image data learned from the training data set. However, the synthetic image data may no longer depict any images of "real" items, in the sense that the items depicted in the living rooms drawn by the trained generator do not exist in reality. Similarly, the generator (or other model) may learn to generate synthetic images of faces or any other image distribution.

Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at operation 402, at which a selection of a first image having a plurality of image attributes representing visual characteristics of at least one object depicted in the first image may be received. Image attributes may include, for example, the hairstyle of a person, a data representation of the identity of a person, different types or styles of furniture present in a room, lighting conditions, high frequency image data, low frequency image data, color values, etc. In various examples, the image attributes may be multi-dimensional image attributes in which the vector representations of such attributes are multi-dimensional.

Processing may continue to action 404, at which a selection of at least one first image attribute to be maintained in subsequently generated images may be received. For example, a user may select that identity of a person depicted in the first image should be maintained, or that a particular piece of furniture depicted in the first image should be maintained. In other examples, the user may specify that the lighting condition may be maintained. In general, any multi-dimensional attribute of the first image may be maintained, while other attributes may be varied using the techniques described herein. Additionally, multiple attributes may be selected and may be maintained in subsequently-generated images.

Processing may continue to action 406, at which a selection of at least one second image attribute of the plurality of image attributes to be modified in subsequently-generated images may be received. At action 406, a selection of at least one second image attribute that is to be modified in subsequently-generated images may be received. In some examples, the attributes to be modified may not be explicitly selected. Instead, attributes that have not been selected for being maintained from image-to-image may be modified. Modifying attributes of the first image apart from those one or more attributes that have been selected to be maintained may be considered as selecting those attributes for modification, in the various descriptions herein.

Processing may continue to action 408, at which a first machine learning model may generate at least one second image having the plurality of image attributes. The appearance of the at least one first image attribute may be maintained with respect to the first image and appearances of the at least one second image attribute may be varied with respect to the first image based at least in part on a traversal of the latent space of the first machine learning model. For example, the latent space of a GAN generator may be traversed in a direction that maintains the multi-dimensional attribute(s) that have been selected to be maintained (e.g., the at least one first image attribute) while varying at least one second image attribute. The direction of the traversal may be calculated as described above.

Processing may continue from action 408 to action 410, at which the at least one second image may be output. For example, the at least one second image may be output as a file and/or displayed on a display. The output images may be used in a training dataset to train other machine learning models. In other examples, the output images may be displayed to a user to show the user different variations of the input image that are similar in one or more respects while different in other respects.

Figure 5:
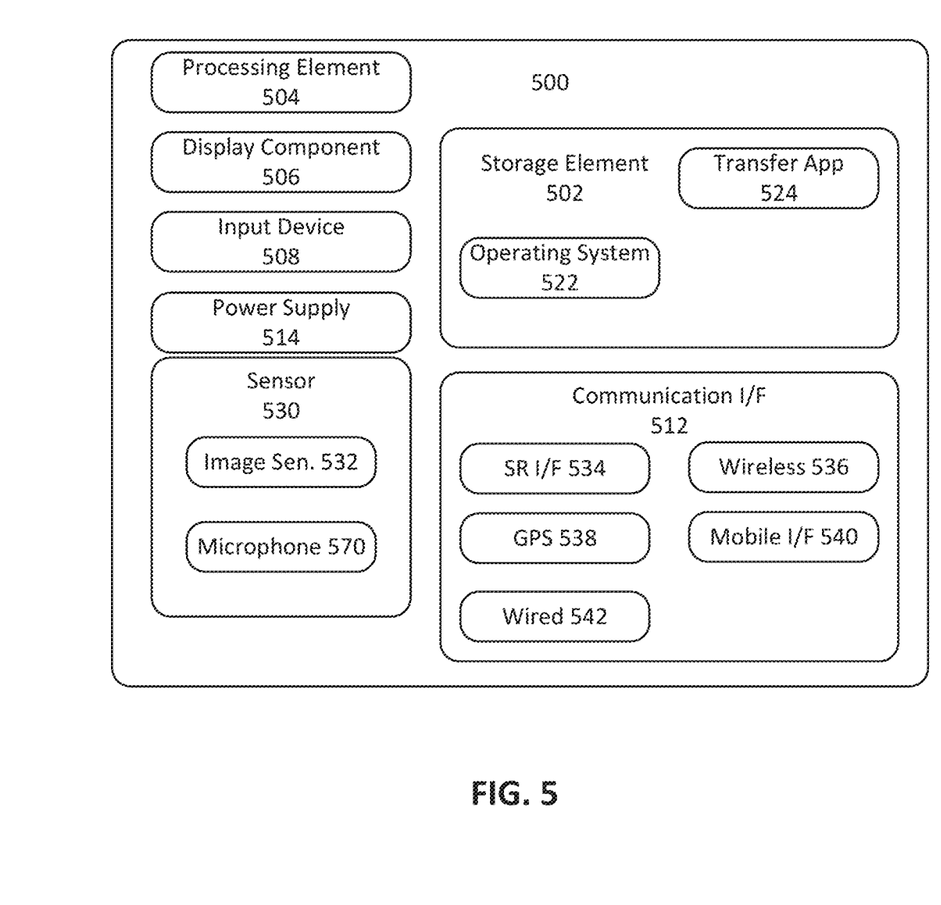
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models and/or generate synthetic image and/or video data, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
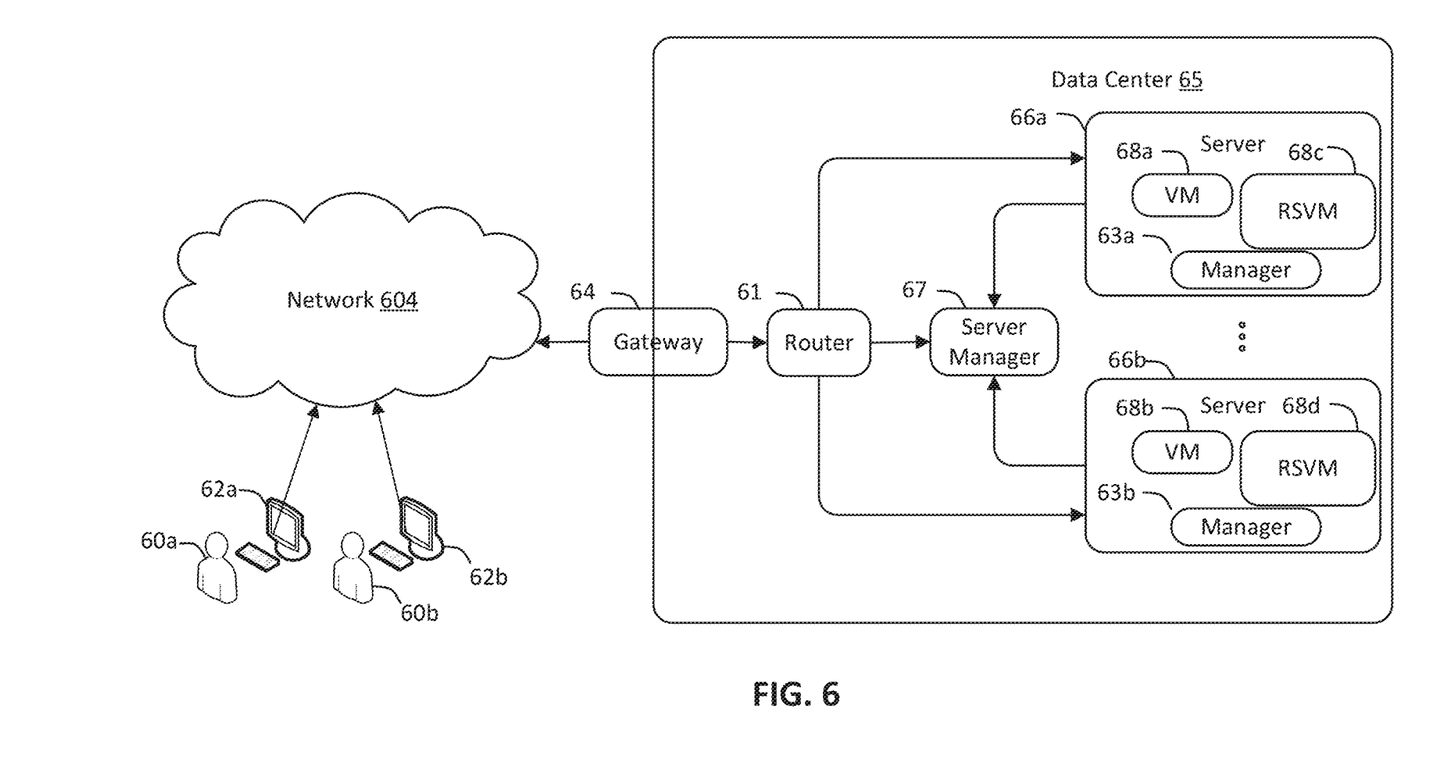
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM")

instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
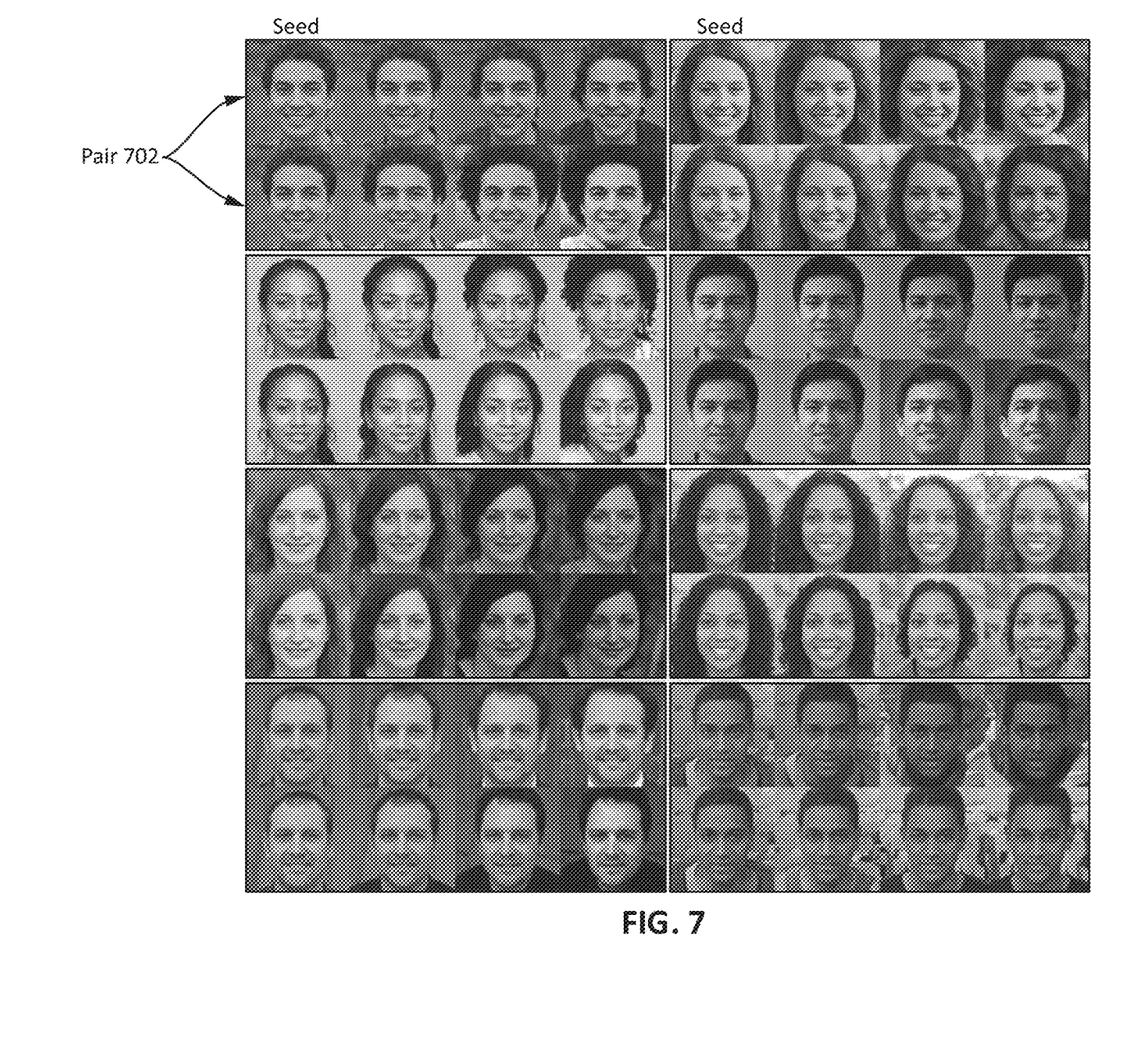
FIG. 7 depicts a plurality of synthetic human face images generated from eight seed images, in accordance with various aspects of the present disclosure.

FIG. 7 depicts a plurality of synthetic human face images generated from eight seed images, in accordance with various aspects of the present disclosure. FIG. 7 depicts 16 traversals for 8 seed faces. Each traversal preserves identity while changing all other image attributes such as image background, hair style, lighting, expression, and clothing. For each pair of identical seed faces (e.g., pair 702), the three adjacent images represent traversals along different paths that maintain the identity while changing other attributes according to the path traversed.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating images comprising:
receiving, by a computing device, a selection of a first image, the first image having a plurality of image attributes, each image attribute representing a corresponding visual characteristic of at least one object depicted in the first image, wherein each of the plurality of image attributes is represented using a multi-dimensional vector;
determining a multi-dimensional attribute embedding of the first image in a latent space;
receiving, by the computing device, a selection of at least a first image attribute among the plurality of image attributes, the selection indicating that an appearance of at least the first image attribute is to be maintained in subsequently-generated images;
generating, using a first machine learning model, a second image having the plurality of image attributes, wherein the appearance of at least the first image attribute is maintained with respect to the first image and wherein appearances of other image attributes among the plurality of image attributes are varied with respect to the first image, wherein the appearance of at least the first image attribute is maintained in the second image and the appearances of other image attributes are varied in the second image based at least in part on traversal of the latent space of the first machine learning model from the multi-dimensional attribute embedding; and
causing, by the computing device, the second image to be rendered on a display.

2. The method of claim 1, further comprising:
determining a path through the latent space from a starting position of the multi-dimensional attribute embedding in a direction that minimizes changes of the first image attribute while maximizing changes to at least one other attribute of the plurality of image attributes, wherein the traversal of the latent space of the first machine learning model comprises selecting points in the latent space along the path.

3. The method of claim 2, further comprising:
generating, using a respective machine learning model for each attribute of the plurality of image attributes, attribute-specific embedding vectors for each attribute of the plurality of image attributes, wherein the latent space comprises a learned distribution of the attribute-specific embedding vectors.

4. A method comprising:
receiving, by a computing device, a selection of a first image, the first image comprising at least a first object, the first object having a plurality of image attributes, each image attribute representing a corresponding visual characteristic of the first object;
receiving a selection of a first image attribute of the plurality of image attributes to be maintained in subsequently-generated images;
receiving a selection of a second image attribute of the plurality of image attributes to be modified in subsequently-generated images;
generating, using a first machine learning model, a second image having the plurality of image attributes, wherein an appearance of the first image attribute is maintained in the second image and an appearance of the second image attribute is modified in the second image by traversing a latent space of the first machine learning model in a direction that minimizes a change in appearance of the first image attribute; and
outputting the second image.

5. The method of claim 4, further comprising traversing the latent space in a second direction that maximizes the change in the appearance of the second image attribute.

6. The method of claim 4, further comprising generating, using the first machine learning model, a plurality of third images, wherein each image corresponds to a different point in the latent space of the first machine learning model and different degrees of change in the appearance of the second image attribute of the plurality of image attributes.

7. The method of claim 4, wherein the first image attribute is represented using a multi-dimensional vector.

8. The method of claim 4, further comprising:
generating a plurality of third images by varying the appearance of the other attributes of the plurality of image attributes by different degrees; and
training a second machine learning model using the plurality of third images.

9. The method of claim 4, further comprising receiving an instruction to maintain an appearance of the first object in the first image, wherein the appearance of the first object is maintained throughout a plurality of third images generated using the first machine learning model, while respective appearances of other objects depicted in the first image are changed in the plurality of third images.

10. The method of claim 4, further comprising modifying an arrangement of other objects in the second image with respect to the first image while maintaining a position of the first object in the second image with respect to the first image.

11. The method of claim 4, further comprising calculating a plurality of eigenvectors representing the direction in which to traverse the latent space of the first machine learning model such that the plurality of eigenvectors conform to a manifold of the latent space that maintains the appearance of the first image attribute.

12. The method of claim 4, further comprising:
calculating an eigenvector representing the direction in which to traverse the latent space of the first machine learning model, the eigenvector being tangential to a surface of a manifold of the latent space that maintains the appearance of the first image attribute.

13. A system comprising:
at least one processor; and
non-transitory computer-readable memory storing instructions that, when executed by the at least one processor, are effective to:
receive a selection of a first image, the first image comprising at least a first object, the first object having a plurality of image attributes, each image attribute representing a corresponding visual characteristic of the first object;
receive a selection of a first image attribute of the plurality of image attributes to be maintained in subsequently-generated images;
receive a selection of a second image attribute of the plurality of image attributes to be modified in subsequently-generated images;
generate, using a first machine learning model, a second image having the plurality of image attributes, wherein an appearance of the first image attribute is maintained in the second image and an appearance of the second image attribute is modified in the second image by traversing a latent space of the first machine learning model in a direction that minimizes a change in appearance of the first image attribute; and
output the second image.

14. The system of claim 13, wherein the non-transitory computer-readable memory stores further instructions that, when executed by the at least one processor, are further effective to:
traverse the latent space in a second direction that maximizes the change in the appearance of the second image attribute.

15. The system of claim 13, wherein the non-transitory computer-readable memory stores further instructions that, when executed by the at least one processor, are further effective to:
generate, using the first machine learning model, a plurality of third images, wherein each image corresponds to a different point in the latent space of the first machine learning model and different degrees of change in the appearance of the second image attribute of the plurality of image attributes.

16. The system of claim 13, wherein the first image attribute is represented using a multi-dimensional vector.

17. The system of claim 13, wherein the non-transitory computer-readable memory stores further instructions that, when executed by the at least one processor, are further effective to:
generate a plurality of third images by varying the appearance of the other attributes of the plurality of image attributes by different degrees; and
train a second machine learning model using the plurality of third images.

18. The system of claim 13, wherein the non-transitory computer-readable memory stores further instructions that, when executed by the at least one processor, are further effective to:
receive an instruction to maintain an appearance of the first object in the first image, wherein the appearance of the first object is maintained throughout a plurality of third images generated using the first machine learning model, while respective appearances of other objects depicted in the first image are changed in the plurality of third images.

19. The system of claim 13, wherein the non-transitory computer-readable memory stores further instructions that, when executed by the at least one processor, are further effective to:
modify an arrangement of other objects in the second image with respect to the first image while maintaining a position of the first object in the second image with respect to the first image.

20. The system of claim 13, wherein the non-transitory computer-readable memory stores further instructions that, when executed by the at least one processor, are further effective to:
calculate a plurality of eigenvectors representing the direction in which to traverse the latent space of the first machine learning model such that the plurality of eigenvectors conform to a manifold of the latent space that maintains the appearance of the first image attribute.

* * * * *